ber 62, connected to a registering mechanism 63 through a train of gears, and rotated by the resultant magnetic flux established by the currents flowing in the two coils 64 and 65, the coil 64 being connected across the auxiliary circuit and normally having either a voltage proportional to the load voltage or zero voltage impressed across it, while the coil 65 is connected in series with the line, and carries a current either equal to or proportional to the current flowing to the load 6. When current flows through both coils a rotating magnetic field is established, which causes the member 62 of the meter to be rotated.

In a distribution circuit having a great many metered loads the energy supplied to the potential coils of all the consumers' meters is considerable, which, with the system shown in Figure 1, would require that the rotating segmented disks and their contact making fingers must be comparatively large, so that they could break the circuit under such conditions. In order to avoid this I have provided a modified construction, shown in Figure 2, for controlling the make and break of the auxiliary circuit as follows: The wire 46 leading from the shaft 58 carrying current through one of the disks 50 to 57, as well as the wire 61 leading from the contact 43, are connected in the circuit with a relay 66, which, when energized, by means of its armature 67 closes a control circuit at contact 68, said circuit being supplied by wires 69 and 70, from any suitable source of power, such as a generator or a storage battery, with the former of which the switch arm 28 may be connected by lead 28', and through switch 71, closes a circuit through the auxiliary transformer 47, the current for this circuit being derived from the transformer 72 in the main line 1, 2, or from some other suitable source. By this arrangement the control current through the wires 69, 70, may be of any desired strength, and the size of the disks 50 to 57 and their cooperating parts governed accordingly.

The operation of my system of measuring power will be understood as follows: When no current is flowing through the main line 1, 2, the frame 13 will be drawn by the tension of spring 29 clockwise, thereby closing contact at 17, energizing magnet 31, closing contacts at 32 and 33 and causing a current to pass through the lines 22, 23, 34 and 34', to the motor 24, which will rotate the screw 25 so as to move the switch arm 28 counter-clockwise until the switch arm comes in contact with contact 35, in which position the spring 29, which may be properly adjusted by the turnbuckle 78, will cease to be under tension, whereupon the frame 13 will resume its intermediate position breaking contact at 17 and stopping the motor 24. Now when an electrical load is put on the system the current passing through the current balance immediately will cause the frame to move counter-clockwise, closing the circuit at 16, energizing magnet 18, closing the contacts at 20 and 21, 22, and completing the electrical circuit through the wires 23, 34, and 34' to the motor 24, causing the latter to rotate the screw 25 and move the switch arm 28 clockwise or downward, so that it will engage successively with contacts 35, 36, etc., this movement of the motor and the switch arm continuing until the tension of the spring 29 equals the torque of the current balance, whereupon the frame 13 will assume its intermediate position, breaking contact at 16 and stopping the motor 24. If the generator is supplying a maximum load to the system the switch arm 28 will move until it engages with contact 43, in which position there is a constant flow of current through the line 61, and a consequent continuous registration of energy consumption in the consumers' branches of the distribution circuit. But if the generator supplies a load to the distribution circuit which is less than the maximum, the position of the switch arm 28 will be shifted correspondingly to a position, say in engagement with contact 40, as shown in the drawings, which will cause the auxiliary circuit to be connected through the segmented disk 55 and thus to be broken for 24 seconds of each minute, as hereinbefore described, similarly stopping the registration of energy consumption in the consumers' branches of the circuit for that amount of time during each minute. By means of this system, the operation of the power registering mechanism in the consumers' branches of the distribution circuit will be governed automatically by the magnitude of the current flowing through the main lines 1, 2, so that under full load said register will operate continuously, but will register energy consumption intermittently and in accordance with the measured load when the load is less than the maximum. Thus, when the load on the entire system changes, the switch arm 28 assumes a new position, and completes the auxiliary circuit through a different contact plate, and a differently proportioned segmented disk interrupts the auxiliary circuit, thus offering a new rate to the consumers.

While I have shown and described my improved system as applied to single phase power distribution circuits, where energy is transmitted at high voltage and delivered to the consumers' circuits at low potential, it will be understood that this method of measuring energy consumption is not limited to single phase systems of power distribution, as it is equally well adapted to be used in connection with two phase, three phase or any polyphase systems of power distribu- Oct. 6, 1925.
T. A. CARSON
GAME
Filed May 22, 1924
1,555,909
3 Sheets-Sheet 2
Fig. 2.
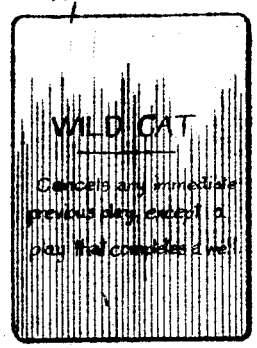
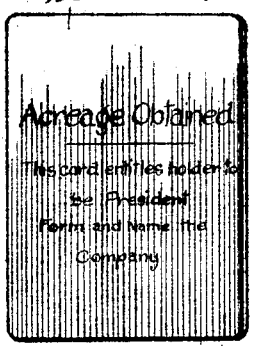
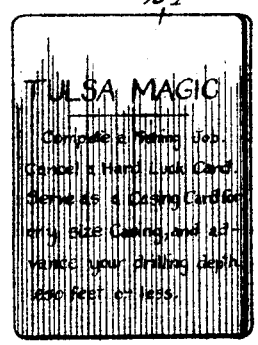
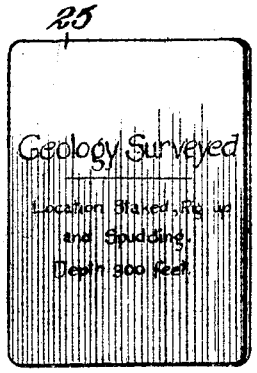
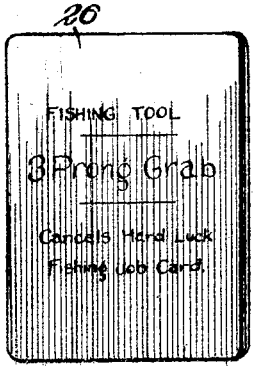
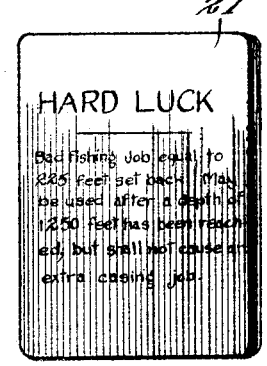
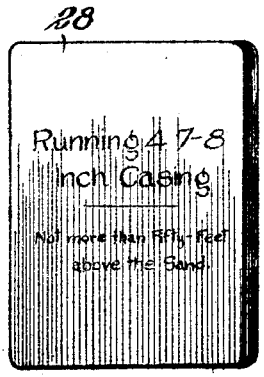
INVENTOR
T. A. Carson.
BY
ATTORNEYS Oct. 6, 1925.

T. A. CARSON

GAME

Filed May 22, 1924

INVENTOR
T. A. Carson.
BY
ATTORNEYS

Patented Oct. 6, 1925.

1,555,909

UNITED STATES PATENT OFFICE.

THURMAN A. CARSON, OF JENNINGS, OKLAHOMA.

GAME.

Application filed May 22, 1924. Serial No. 715,141.

*To all whom it may concern:*

Be it known that I, THURMAN A. CARSON, a citizen of the United States, and resident of Jennings, in the county of Pawnee and State of Oklahoma, have invented certain new and useful Improvements in Games, of which the following is a specification.

My invention is a game, and it consists in the combinations, constructions and arrangements herein described and claimed.

An object of the invention is to provide an entertaining and instructive game, the playing of which will provide an understanding of the steps which are involved in the drilling of an oil well and of the problems and difficulties which are likely to be met and must be overcome if the drilling of an oil well is to be accomplished successfully.

A further object of the invention is to provide a game of the character described which is adapted to be played by two or a greater number of persons.

Other objects and advantages will be apparent from the following description, considered in conjunction with the accompanying drawings, in which—

Figure 1 is a plan view of a game board and markers which are used in playing the game.

Figure 2 is a plan group view of the different kinds or suits of cards which are used in the playing of the game.

Figure 3:
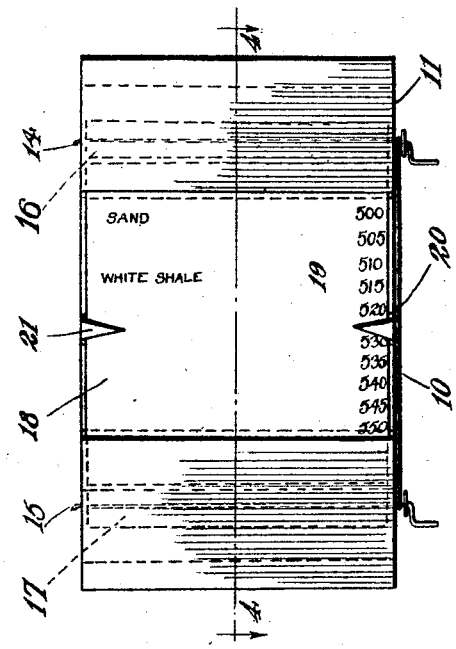
Figure 3 is a plan view of an indicator which is used in the playing of the game.

In general, the operation of drilling an oil well involves the drilling of the well bore and the insertion in the well bore of suitable lengths of tubular casing. The lengths of casing are of different diameters and the lengths of casing of different sizes are inserted or "run" in sequence according to the depth of the well bore and according to the character and formation of the strata through which the well bore extends, the casing decreasing in size as the depth of the well bore increases. It therefore is important that casing of the proper size should be inserted or "run" at the proper time to permit further drilling of the well to a desirable depth and to obviate conditions which otherwise would be encountered and would prevent the completion of the drilling of the well, such conditions including the filling of the well bore with water. The successful playing of the game requires the exercise of good judgment in the selection of casings of different sizes to be inserted at different depths and to overcome or obviate specific conditions to the end that the drilling of a well to an oil bearing sand may be effected in a minimum of time. The success of a player of the game also depends largely on his ability to determine the proper action which should be taken to overcome the various obstacles which ordinarily are encountered in actual drilling operations.

In carrying out the invention, I provide a game board 1 as shown in Figure 1. The board 1 may be constructed in any suitable known manner as by being formed of a plurality of superposed plies of card board or like relatively stiff material secured together by glue or in any other suitable known manner. The board 1 has produced on the face thereof a design which may be the representation of a derrick indicated at 2, a steam boiler indicated at 3 and associated apparatus indicated generally at 4, such as are ordinarily employed in the drilling of an oil well. The board 1 also has produced on the face thereof two series of spaced apart circles 5 graduated in size and each being marked with a character which denotes a particular size of casing, the respective series of circles being disposed adjacent to two marginal edges of the board and the characters employed to designate the respective circles of each series having values graduated according to the sizes of the circles.

The board 1 also may have produced thereon certain other indicia, such as the encircled letters D, R, S, G at the four corners and adjacent to the four marginal edges of the board, the words "Tulsa Gusher or wildcatting" and the picture of a wild cat. In addition, the board 1 has two concentric circles produced on the face thereof, thus defining an annular space which is divided by radial lines into a series of spaces 6 which thus are disposed in a circle. A pointer in the form of a straight strip 7 is pivoted intermediate its length on the board 1, as at 8, to swing about the axis of the circular series of spaces 6 and is of sufficient length to extend radially to the spaces 6. Certain of the spaces 6 are extended radially inward to the center of the series of spaces 6, as indicated at 9 to provide space for indicia, such as the words "Go to goosing grass," "Back to roustabouting" and "Throw me in the slush pond." The remaining series of spaces 6 have numerals produced thereon which vary in value. Either end of the pointer strip 7 may be the indicating end of the strip and may be used to point out the numerals in the spaces 6. The pointer strip 7 is adapted to rotate rather freely about its pivot 8 and to gradually come to rest after a torque has been imparted thereto.

The portion of the board 1 having the series of spaces 6 and the numerals in the spaces produced thereon may be termed a dial and the strip 7 is the pointer which is adapted to cooperate with the dial.

Figure 4:
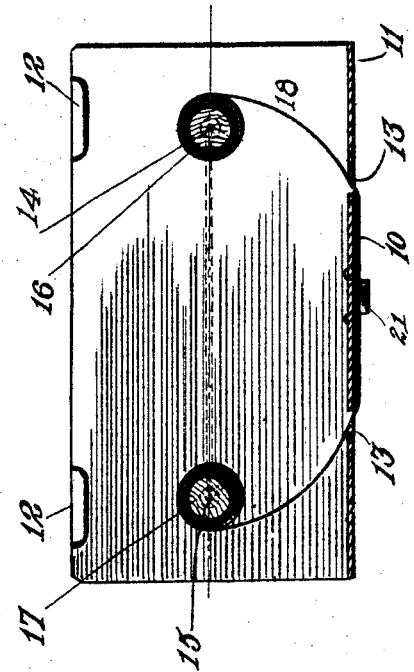
Figure 4 is a section along the line 4—4 of Figure 3.

An indicator designated generally at 10 is shown in Figures 3 and 4 and comprises a frame 11. The frame 11 is preferably made of a light gauge metal and comprises a top and sides, the sides being connected at their lower ends by transverse members 12 if desired. The top of the frame is provided with a pair of transverse slots 13 respectively located adjacent to the opposite ends of the top of the frame. A pair of shafts 14 and 15 respectively extend transversely of the frame and are journaled in the sides of the frame, the respective shafts being located adjacent to opposite ends of the frame. Each shaft has an extended end portion fashioned into a crank handle adapted to be grasped and manipulated to cause rotation of the shaft. The shaft 14 has a cylinder or reel 16 secured thereto between the sides of the frame and the shaft 15 has a cylinder or reel 17 secured thereto and also located between the sides of the frame. An elongated strip 18 of paper or like material is threaded through the slots 13 from the upper face and the end portions of the strip are secured to the cylinders or reels 16 and 17, one end portion of the strip being secured to the reel 16 and the other end portion of the strip being secured to the reel 17. With this arrangement, it will be apparent that when the crank handle of the shaft 14 is turned in an anti-clockwise direction, the strip will be wound upon the reel 16 from the reel 17 and in passage from the reel 17 to the reel 16 will pass across the portion of the top of the frame that extends between the two slots 13.

When the crank handle of the shaft 15 is swung in a clockwise direction, the direction of movement of the strip 18 will be reversed and the strip will be wound upon the cylinder or reel 17 and unwound from the cylinder or reel 16. The strip 18 is provided on its upper face with a scale 19 consisting of a series of numerals disposed on the strip adjacent to one lateral edge of the strip and increasing in value from one end of the strip to the other end thereof. An index element 20 is struck up from the top of the frame 11 at one side of the latter for indicating the numbers of the scale 19 as the strip 18 is drawn across the portion of the top of the frame that extends between the slots 13. The strip 18 is also provided on its upper face adjacent to its other marginal edge with legends or indicia, such as the words "Sand" and "White shale," as shown in Figure 3. These legends or indicia are located at intervals along the strip in transverse alignment with numerals of the scale 19 and indicate the character of the strata at different depths, which depths are indicated by the numerals of the scale 19. A struck up index element 21 which is opposite the index element 20 is adapted to point to the nearest legend or indicia on the strip 18 when the index element 20 points to any particular number on the scale 19 or in other words, the index element 21 indicates the character of the layer or stratum of earth which will be found at the depth indicated by the index element 20. The index elements 21 and 20 also serve as guides for the portion of the strip 18 which is moving across the top of the frame between the slots 13 and tend to hold such portion of the strip close to the top of the frame.

The equipment used in playing the game also includes a pack of 72 cards. The cards in this pack may be divided according to the character of the indicia on the faces thereof into eight different groups or suits as illustrated in Figure 2 and respectively indicated at 22, 23, 24, 25, 26, 27, 28 and 29.

The indicia on the cards have relation to the steps involved in the drilling of an oil well.

The equipment for playing the game also includes two sets of markers 30 and 31 respectively as shown in Figure 1, there being seven markers in each set and the markers of one set being colored to contrast with the markers of the other set.

The game is played substantially as follows: Two or more persons may participate in the playing of the game but if there are more than two players, the players are arranged in two groups or companies. The manner of dividing a number of players greater than two into companies will be presently described.

The cards are dealt three to each player until all cards have been dealt. The respective players examine their cards to locate the cards 23, there being only two of the cards 23 in the pack. Each of the cards 23 has "Acreage obtained" on its face. The two players to whom the cards 23 have been dealt form the two competing companies by selecting the remaining players in turn until all the players are divided into one or the other company. The next step in the actual drilling of a well after acreage has been obtained is a geological survey, the location then being staked and the drilling equipment set up and spudded in. Therefore, after the two cards 23 have been located and the companies have been formed in the manner described, the players examine their cards until the cards 25 which bear the words "Geology surveyed" have been located, there being only two cards 25 in the pack. The object of the game being to determine which of the two companies can drill an oil well successfully and in less time than the other company, it is obvious that one of the companies would be thrown out of the game if both of the cards 25 were found to be in the possession of players belonging to one company. It then would be necessary to repeat the portion of the game which has been described until the cards 25 are found in the possession of players belonging to different companies. Two of the indicators 10 are used in playing the game, one of these indicators being assigned to each company or to each player if only two players participate in the game. Possession of the cards 25 entitles the possessors to credit for having started drilling operations and having drilled to a depth of 300'. The player or company first locating the card 25 is entitled to this credit before the same credit is given to the opposing company or player. The indicators 10 of the companies or players are manipulated until the index elements 20 point to numerals 300 on the scales 19. The cards now are shuffled and redealt to the players, three cards at a time until each player holds six cards. The player at the left of the dealer examines his hand and if he possesses one of the cards 29 which bears the words "Drilling spin" he is entitled to spin the pointer 7 and to then add to the number which appears opposite the index element 20 on his indicator 10 the amount which is indicated by the pointer 7 when the latter comes to rest.

The opposing player or one of the players of the opposing company now examines the cards which have been dealt to him and if he possesses one of the cards 29 he also spins the pointer 7 and adds to the indicated number on his indicator 10 the number to which the pointer 7 points as a result of the spinning operation. It is to be understood at this point that the pointer 7 represents the usual measuring stick by means of which the length of drilling cable that has been paid out during each shift or "tour" is measured in actual drilling operations and that the number indicated by the pointer 7 after each spinning of the latter represents the number of feet the well was drilled during a given shift or "tour", each spinning of the pointer 7 representing a shift, "tour" or working period. The remaining players examine the cards which have been assigned to them and each in turn spins the pointer 7 if he is in possession of one of the cards 29 and then operates the indicator 10 for his company to add to the total indicated thereon as being the depth to which the well has been drilled at a given time. If any one of the players does not have one of the cards 29, he may discard one of his cards on the table face up and call out "Pass". He thus does not aid in the drilling of his well or the well of his company nor does he retard the drilling of his opponent's well. However, if he possesses one of the cards 27, which bears the words "Hard luck" together with other indicia to indicate the effect of the playing thereof and the particular time at which a particular card 27 can be played, he may play the card 27 at the proper time and thus compel his opponent to set his indicator (the opponent's) to indicate an amount less than that previously indicated. The opponent may avoid the effect of the card 27 by playing the appropriate card 26.

The amount indicated by the pointer 7 after each spinning thereof must always be used in full, if used at all. In the event that this would result in drilling through a desirable sand, the player or company entitled to add an amount indicated by the pointer 7 to that indicated by the indicator 10 of that player or company may refuse to drill further when near the desirable sand. The game proceeds in a manner which it is thought will be apparent and understood from the foregoing description, the cards being shuffled and redealt after having been played, a total of six cards being dealt to each player at each deal. When a logical place in the well bore has been reached for the insertion of a casing of a given size, that particular casing must be placed in the well before the drilling can proceed. The appropriate card 28 must be in the possession of a player before he is entitled to credit for having "run" the required casing in his well. Each time a casing of a given size is placed in the well bore by a player, one of the markers 30 or 31 is placed on the circle 5 which is marked to correspond with the size of the casing. In the event that the player whose turn it is to play does not have the appropriate cards 28 at the required time, he must call out "Pass" and discard one of his cards. The remaining players must do likewise until the suitable casing card 28 is obtained. The cards 24, of which there are two in the pack, may be used in lieu of one of the cards 26, to cancel one of the cards 27, in lieu of one of the cards 28, or to entitle the player thereof to a drilling credit of 250' or a fractional part thereof, which drilling credit otherwise could be obtained only through the use of one of the cards 29. The cards 22, which is entitled "Wild cat" will cancel any immediate previous play by an opponent including a play by one of the cards 24 except in the one instance in which a play by means of one of the cards 24 completes the well, in which instance the card 22 is not effective.

In the event that the pointer 7 comes to rest in one of the spaces 9—6, then the player who has operated the pointer 7 may continue to spin as his turn comes to play provided that he has one of the cards 29 each time but the amounts indicated by the pointer 7 will not be added to the total on his indicator 10 until he is so fortunate as to be entitled to add 100′ or more as a result of a spinning operation, after which he is again considered as a normal driller or player. The letters "D", "R", "S", "G" on the board 1 respectively indicate "Drilling", "Roustabouting", "Slush pond" and "Goosing grass".

At the beginning of the game, each player receives a marker such as that indicated at 32 in Figure 1 which is colored to distinguish it from the markers 30 and 31. Each player places the marker 32 upon the circle "D", "R", "S" or "G" to indicate his status or the character of work which he is entitled to perform. If a driller or normal player is in good standing, his marker 32 is placed on the circle indicated at "D". If the pointer 7 has been operated by him and has stopped on the space entitled "Back to roustabouting" he must place his marker 32 on the circle R and it must remain there until he has regained his status as a normal driller or player in the manner hereinbefore described. In a like manner, his marker 32 must be placed on the circle indicated by the letter S if the pointer stops at the space entitled ". . . Slush pond" and his marker 32 must be placed on the circle indicated by the letter G if his pointer came to rest on the space indicated by the legend ". . Goosing grass".

I claim:—

1. In a game, a board provided with a dial having a scale comprising characters representing quantities of linear measurements and a pivoted pointer for cooperating with the scale on the dial, and a pack of cards, certain of said cards bearing indicia indicating that the possessor thereof is entitled to spin said pointer and to credit in the drilling of a well to the quantity which is indicated by said pointer after it has been operated.

2. In a game apparatus of the character described, an indicator comprising a frame having a top and a pair of sides, said top having two parallel transversely extending slots in said top, a pair of rotatable reels supported between said sides of the frame, an elongated record strip threaded through said slots in the top and having the opposite ends thereof wound about the respective reels, said strip having a scale thereon extending longitudinally thereof and comprising characters representing depths of a well bore in feet, said strip also having other indicia thereon related in position on the strip and in value to the characters of said first named scale.

THURMAN A. CARSON.